(12) United States Patent
Kleinmanns et al.

(10) Patent No.: US 9,850,615 B2
(45) Date of Patent: Dec. 26, 2017

(54) PULLEY FOR WASHING MACHINE

(71) Applicant: Whirlpool Corporation, Benton Harbor, MI (US)

(72) Inventors: Thomas D. Kleinmanns, Saint Joseph, MI (US); Kurt Werner, Saint Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 682 days.

(21) Appl. No.: 13/956,653

(22) Filed: Aug. 1, 2013

(65) Prior Publication Data

US 2015/0033802 A1 Feb. 5, 2015

(51) Int. Cl.
*D06F 37/30* (2006.01)
*F16H 55/48* (2006.01)
*D06F 37/40* (2006.01)
*D06F 23/04* (2006.01)

(52) U.S. Cl.
CPC .............. *D06F 37/30* (2013.01); *D06F 37/40* (2013.01); *F16H 55/48* (2013.01); *D06F 23/04* (2013.01)

(58) Field of Classification Search
CPC ...... D06F 37/40; D06F 37/304; D06F 37/206; D06F 37/30; F16H 55/48
USPC ...... 68/23.7, 140, 133, 24, 12.24, 23.3, 3 R, 68/12.16, 142; 474/161, 94, 170, 190, 474/199, 166; 192/84.961, 110 B, 12 BA, 192/209
See application file for complete search history.

(56) References Cited

U.S. PATENT DOCUMENTS

| | | | |
|---|---|---|---|
| 3,696,685 A | * | 10/1972 | Lampredi ............. F16H 55/171 474/161 |
| 4,722,722 A | * | 2/1988 | Rampe .................... F16H 7/023 474/161 |
| 7,415,849 B2 | | 8/2008 | Kim |
| 2009/0193854 A1 | * | 8/2009 | Chang .................... D06F 37/40 68/12.24 |

FOREIGN PATENT DOCUMENTS

| | | |
|---|---|---|
| DE | 148088 A1 | 5/1981 |
| GB | 2396395 B | 9/2005 |
| GB | 2412711 A | 10/2005 |
| JP | 60131046 A | 7/1985 |
| KR | 100210574 B1 | 7/1999 |
| KR | 100797464 B1 | 1/2008 |
| WO | 9946099 A1 | 9/1999 |
| WO | 2007057234 A1 | 5/2007 |

OTHER PUBLICATIONS

German Search Report for Counterpart DE102014107935.3, dated Feb. 6, 2015.

* cited by examiner

Primary Examiner — David Cormier
Assistant Examiner — Thomas Bucci (57) ABSTRACT

A pulley has a plastic body having a peripheral seat and a central hub defining a through opening, with teeth extending from the central hub into the through opening. A metal insert is located within the hub and has at least a portion circumscribing the through opening.

19 Claims, 8 Drawing Sheets

PULLEY FOR WASHING MACHINE

BACKGROUND OF THE INVENTION

Belt drives are commonly used in washing machines, both vertical and horizontal axis machines, to effect a rotation of the basket or drum within the tub and the rotation of a clothes mover, such as an impeller or agitator within the basket. Such belt drives typically include a drive shaft with a pulley fabricated of resin or plastic rotated by a drive motor and drive belt. The hub of the pulley may be attached to the drive shaft with a splined section, and a threaded section receiving a nut. Tightening the nut on the threaded portion against the pulley may impose elevated axial stress on the hub. The pulley material may yield over time, resulting in a loosening of the connection, especially if the nut is over-tightened

BRIEF DESCRIPTION OF THE INVENTION

A pulley has a plastic body having a peripheral seat and a central hub defining a through opening, with teeth extending from the central hub into the through opening. A metal insert is located within the hub and has at least a portion circumscribing the through opening.

DESCRIPTION OF THE PREFERRED EMBODIMENTS

The invention generally relates to a reinforced pulley, and, more specifically a pulley with a reinforcing insert. Such a pulley has wide application, and is suitable for use in a belt drive system of a clothes washing machine. The reinforcing insert is disclosed herein in connection with a clothes washing machine, which may share functionalities with known clothes washing machines. Such shared functionalities may be described herein only as necessary for a full understanding of the embodiments. The embodiments of the reinforcing insert disclosed herein are presented as examples only. The reinforcing insert may be utilized for apparatuses and purposes other than the exemplary apparatus/purposes disclosed, and such purposes are not to be construed in any way as limiting the scope of the claims.

Figure 1:
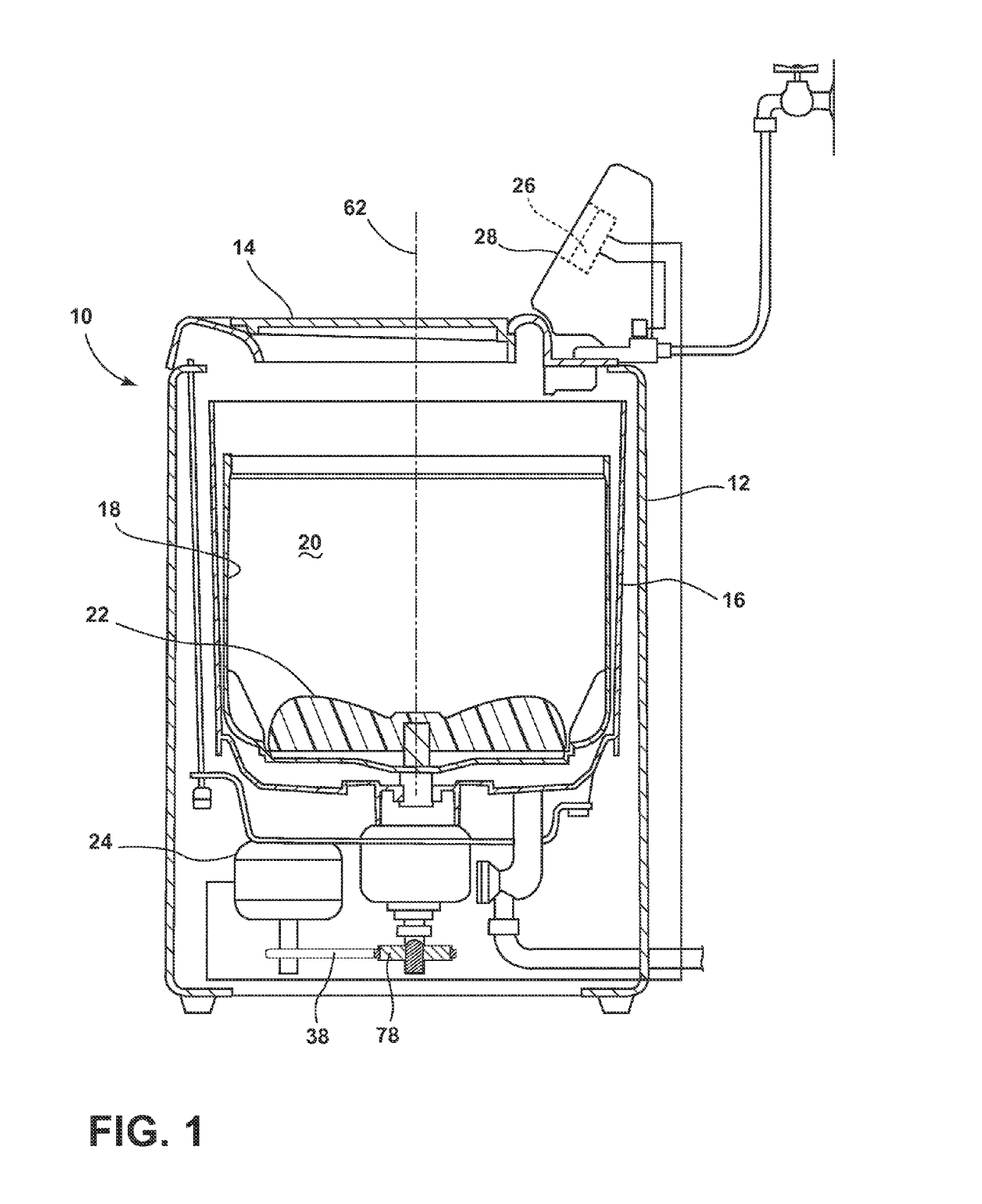
FIG. 1 is a partially cutaway partially sectional elevation view of an exemplary vertical axis automatic clothes washing machine according to the invention, illustrating relevant internal components thereof, including a clothes basket, a clothes mover, a drive motor, a drive belt, and a drive pulley.

Referring to the figures, FIG. 1 illustrates an exemplary vertical axis washing machine 10 that may comprise an open top cabinet 12 closable by a hinged lid 14. The cabinet 12 may house a stationary, imperforate, open top wash tub 16. A perforated, open top basket 18 may be rotatably mounted inside the wash tub 16 and define a laundry treating chamber 20 having a rotatable clothes mover 22 mounted therein, as is generally known in the washing machine art. Rotation of the clothes mover 22 and the basket 18 may be driven by a motor 24 disposed within a lower space in the cabinet 12, operably coupled through a drive belt 38 with a drive pulley 78, and to a controller 26. The controller 26 may communicate with a control panel 28 through which a user may select a desired automatic wash cycle.

A typical wash cycle may comprise at least a wash step to wash the clothes load with wash liquid, a rinse step to rinse the wash liquid from the clothes load with water, and a spin step to extract excess rinse water from the clothes load. During the wash and rinse steps, the clothes mover 22 may oscillate and rotate relative to the basket 18 to move the clothes load and/or liquid within the wash chamber 20. During the spin step, both the clothes mover 22 and the basket 18 may typically rotate at high speeds in a selected direction to extract excess water from the fabric items. Depending on the type of wash cycle selected by a user through the control panel 28, the clothes load may be subjected to combinations and numbers of wash, rinse, and spin steps.

Figure 2:
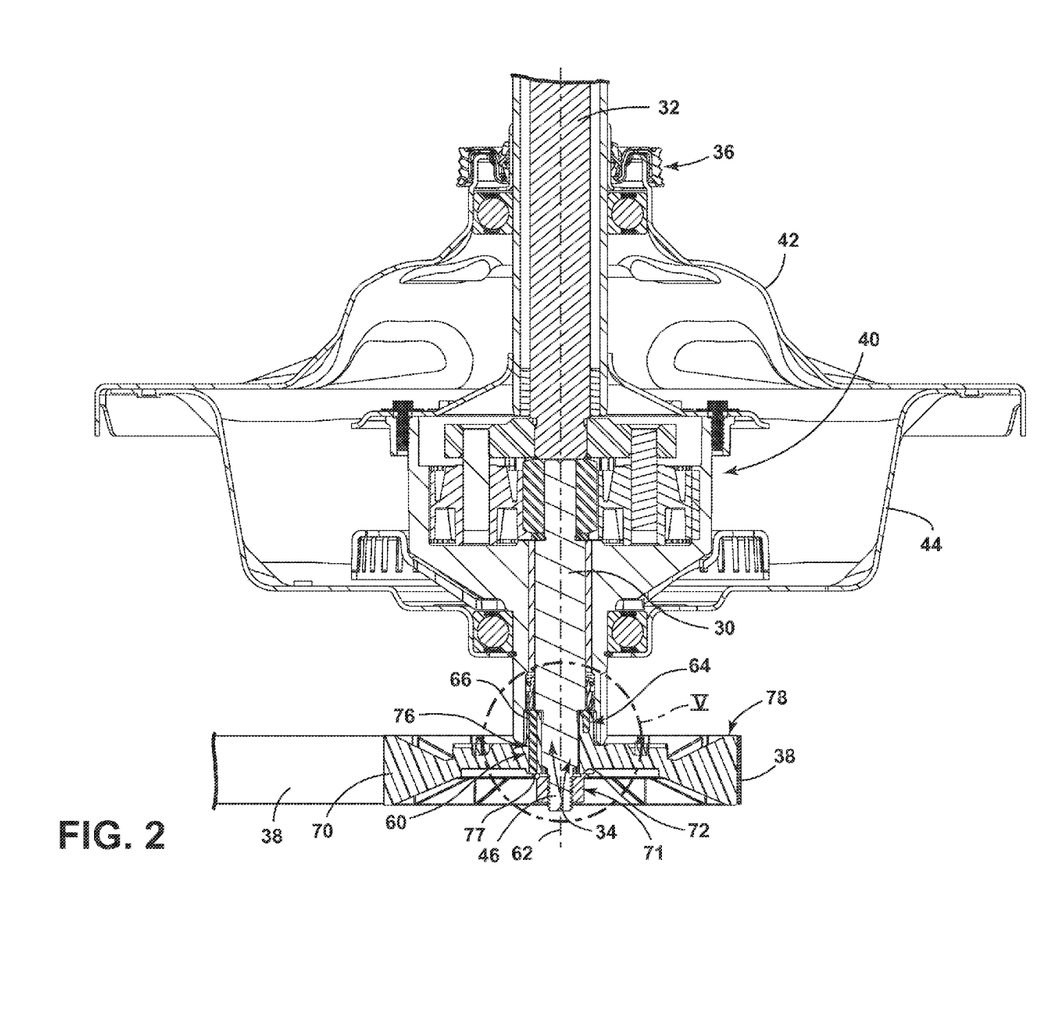
FIG. 2 is a sectional view of a reinforced plastic drive pulley mechanically coupled with a clothes mover shaft for a vertical axis washing machine according to an embodiment of the invention.

Referring also to FIG. 2, the motor 24 may be coupled to the clothes mover 22 through a thin, elongate, generally smooth-walled cylindrical shaft characterized by a longitudinal axis 62 and comprising a lower clothes mover shaft 30 and an upper clothes mover shaft 32, each concentric about the longitudinal axis 62. The lower clothes mover shaft 30 may terminate at a lower end 34 that is couplable with the reinforced drive pulley 78 driven by the drive belt 38 that may be operably coupled with the motor 24, as hereinafter described. The lower portion of the upper clothes mover shaft 32 may rotatably engage a watertight bearing assembly 36 at the top of an upper housing 42. The clothes mover shafts 30, 32 may be longitudinally couplable through a transmission/clutch assembly 40 located in a receptacle comprising the upper housing 42 and a lower housing 44.

Figure 3:
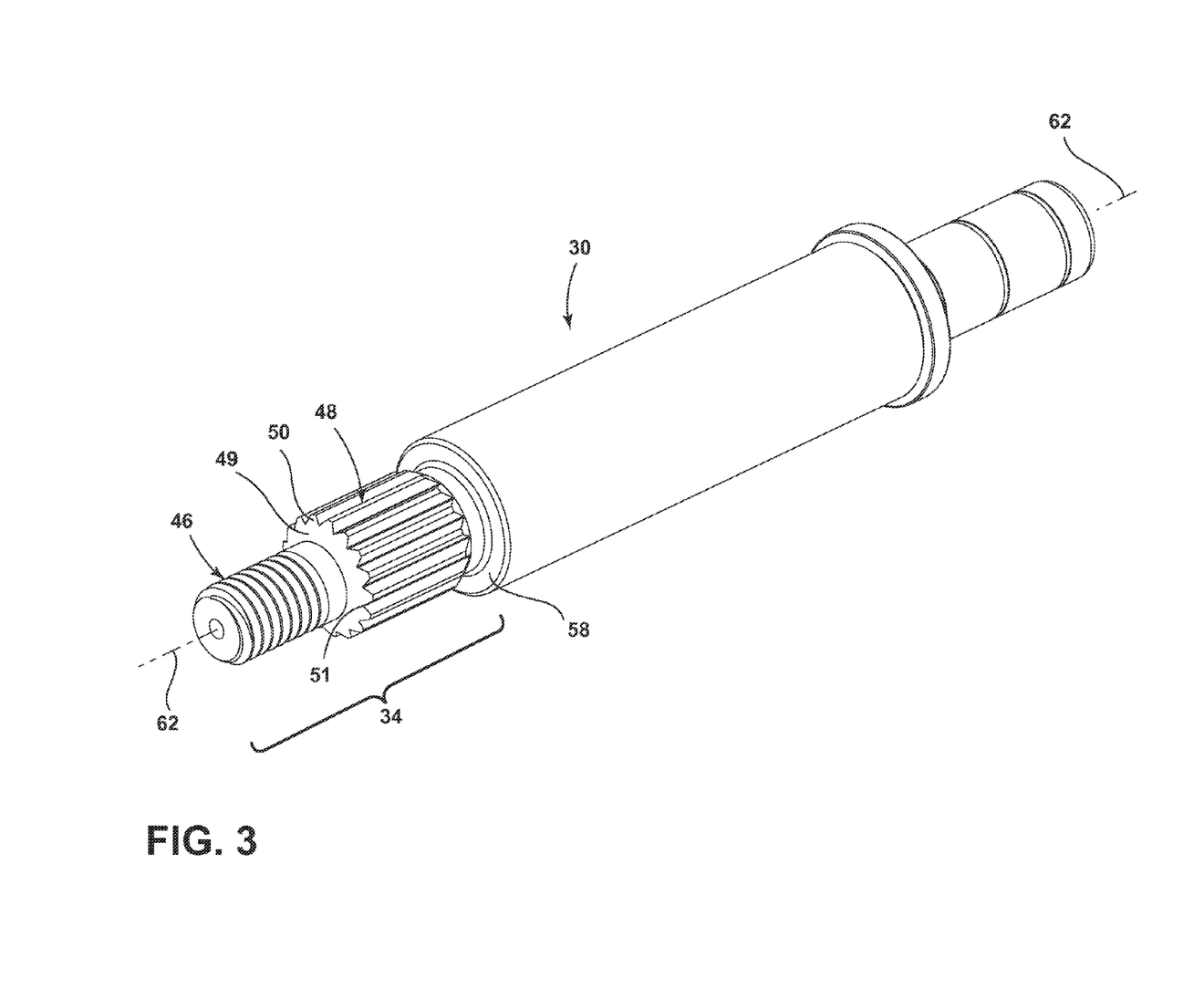
FIG. 3 is an enlarged perspective view of a lower clothes mover shaft illustrated in FIG. 2.

Referring also to FIG. 3, the clothes mover shaft lower end 34 may terminate in a shaft threaded section 46 transitioning radially outward through an annular shaft transition bevel 49 to a shaft splined section 48, which in turn transitions to the smooth-walled portion of the lower clothes mover shaft 30. The threaded section 46 may threadably receive a nut 71 for attaching the drive pulley 78 to the lower clothes mover shaft 30. The threaded section 46 and the shaft splined section 48 may have diameters somewhat less than the diameter of the smooth-walled portion of the clothes mover shaft.

Figure 5:
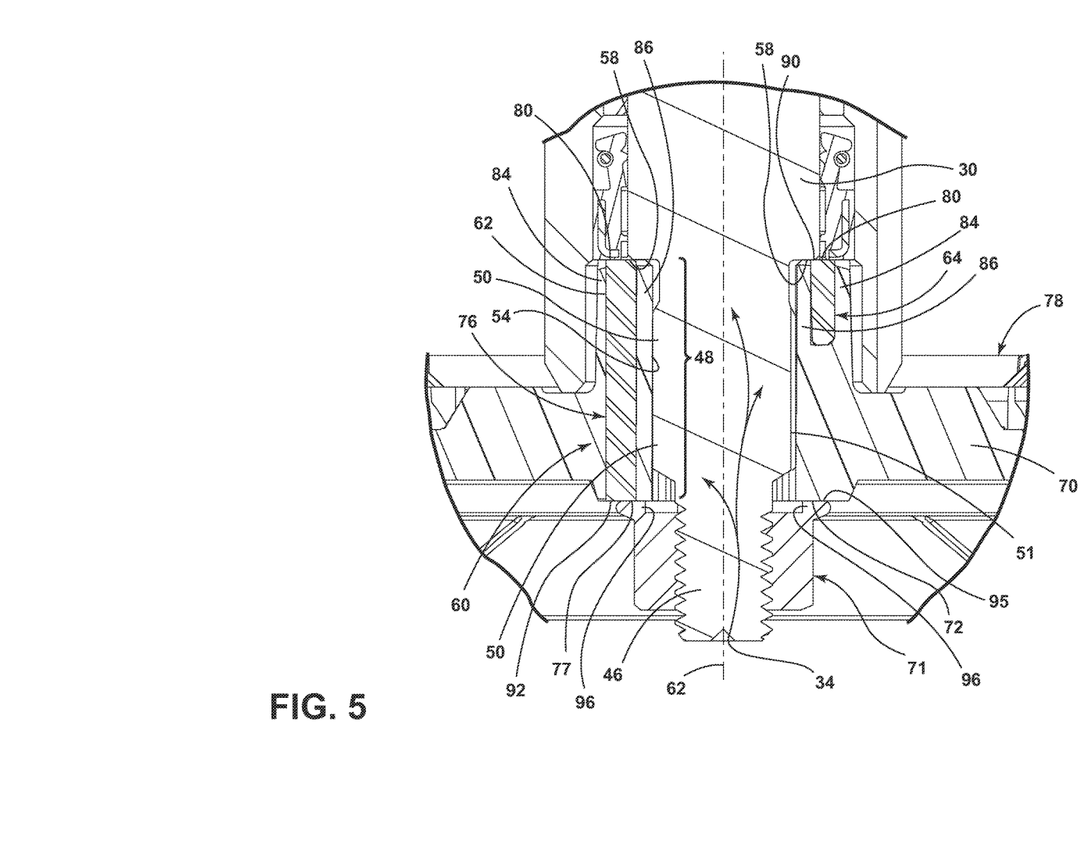
FIG. 5 is an enlarged sectional view of portion V of FIG. 2.

The nut 71 may be a generally known hexagonal nut terminating in a nut annular flange 96 encircling one end, as illustrated in FIGS. 2 and 5.

The shaft splined section 48 may comprise a plurality of radially-outwardly directed elongate shaft splines 50 having a trigonal cross-section, regularly disposed about the circumference of the splined section 48, and parallel with the longitudinal axis 62 oriented through the centers of the lower clothes mover shaft 30 and upper clothes mover shaft 32. The shaft splines 50 may circumferentially alternate with trigonal shaft grooves 51 having a complementary orientation and configuration.

Figure 4:
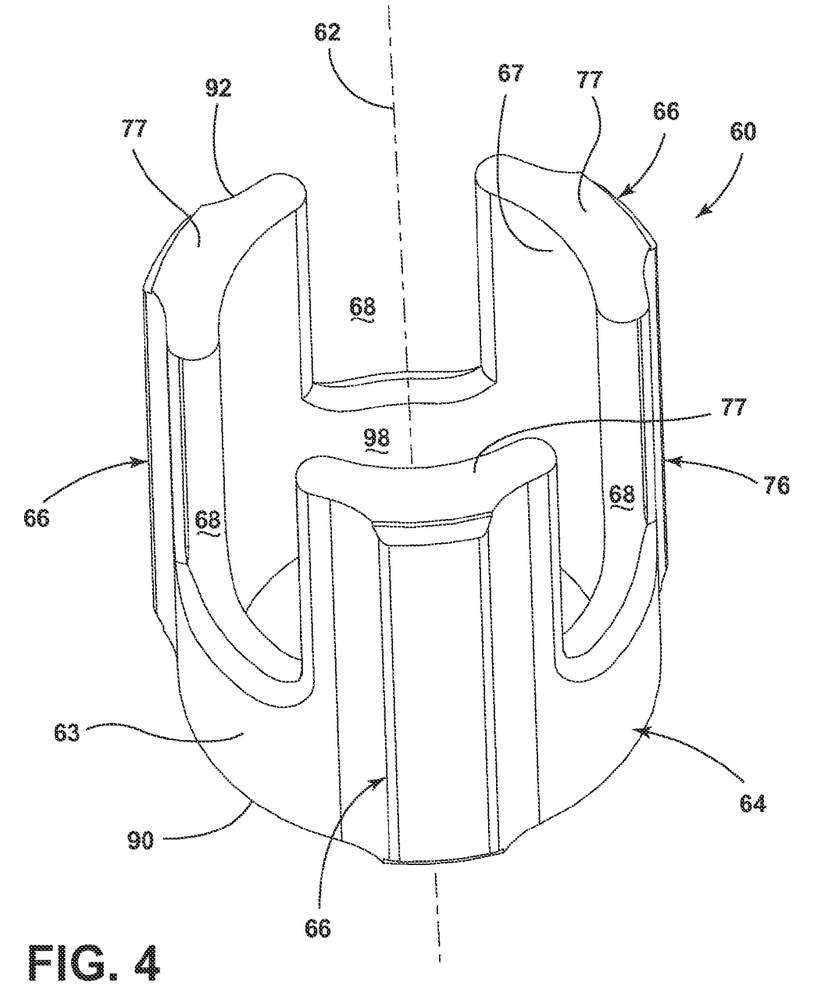
FIG. 4 is an enlarged perspective view of a reinforcing insert illustrated in FIG. 2 according to an exemplary embodiment of the invention.

Referring to FIG. 4, the reinforcing insert 60 may be a generally annular body characterized by an insert continuous end 90, an opposed insert discontinuous end 92, an outer circumferential surface 63, and an inner circumferential surface 67 defining an insert opening 98, both surfaces 63, 67 extending between the insert ends 90, 92. The insert continuous end 90 may define a collar 64 transitioning to a plurality of regularly-spaced fingers 76 terminating at the insert discontinuous end 92. The fingers 76 may define a plurality of regularly-spaced radial gaps 68. Each finger 76 may transition radially outwardly to a raised boss 66 generally parallel with the longitudinal axis 62.

The reinforcing insert 60 may be fabricated of a powder metal. The powder metal (not shown) may be placed in a mold (not shown) having the configuration of the reinforcing insert 60. The mold may have a closed end so that the powder metal may first fill the mold cavities correlating with the fingers 76, and continuing with the cavity correlating with the collar 64. The powder metal in the mold may undergo compression and sintering by subjecting the powder metal in the mold to intense pressure, and by heating the powder metal to a temperature somewhat below its melting point. This may fuse the powder metal particles together into a durable homogeneous material forming the reinforcing insert 60.

Figure 6:
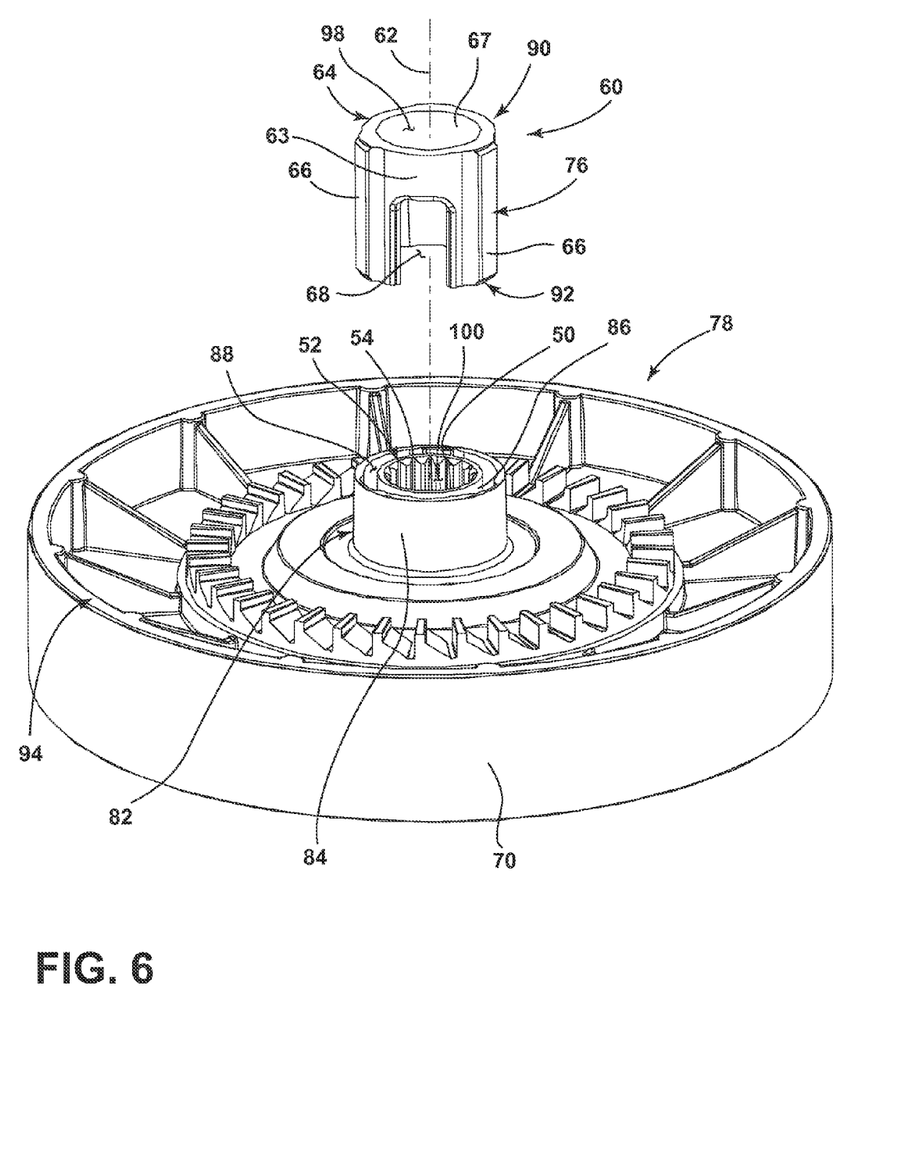
FIG. 6 is an exploded perspective view of the reinforced plastic drive pulley of FIG. 2 illustrating a plastic drive pulley body and a metallic reinforcing insert.

Referring also to FIGS. 5 and 6, the reinforced drive pulley 78 may comprise a circular drive pulley body 70 characterized by a peripheral wall 94 radially coupled with an annular central hub 82, such as through a plurality of ribs, spokes, annular plates, a combination of these, and the like. The peripheral wall 94 may be configured for frictional engagement with the drive belt 38.

The central hub 82 may comprise a generally cylindrical body having an outer annular wall 84 spaced from and concentric with an inner annular wall 86. The inner annular wall 86 may be configured with a hub splined section 52 defining a shaft through opening 100. The hub splined section 52 may comprise a plurality of radially-inwardly directed elongate trigonal hub splines 56, or teeth, alternating with a plurality of trigonal hub grooves 54, regularly disposed about the inner surface of the inner annular wall 86, for cooperative slidable coupling with the shaft splined section 48. The trigonal hub splines 56 and hub grooves 54 may slidably engage the trigonal shaft grooves 51 and shaft splines 50, respectively.

The outer annular wall 84 and inner annular wall 86 may be separated and partly defined by the reinforcing insert 60. In the exploded view of FIG. 6, a simulated "separation" of the reinforcing insert 60 from the central hub 82 may "create" an annular space 88 defined by the reinforcing insert 60. However, as disclosed hereinafter, the drive pulley body 70, including the central hub 82, may be formed of flowable plastic molded around the reinforcing insert 60, thereby precluding the actual formation of an annular space 88.

The reinforcing insert 60 may be placed in a mold to complete the fabrication of the reinforced drive pulley 78. The drive pulley 78 may be fabricated by known molding methods, such as injection molding of flowable plastic around the reinforcing insert 60. The bosses 66 may facilitate manipulating and positioning of the reinforcing insert 60 during the molding process. Injection of flowable plastic into the mold may form the outer annular wall 84, inner annular wall 86, and hub splined section 52 around the reinforcing insert 60.

The plastic may fill the radial gaps 68 to provide an enhanced coupling of the reinforcing insert 60 with the central hub 82. The plastic may also flow around the bosses 66 to "lock" the reinforcing insert 60 into the central hub 82. The insert opening 98 may coaxially encircle the inner annular wall 86 and the shaft splined section 48.

Figure 7:
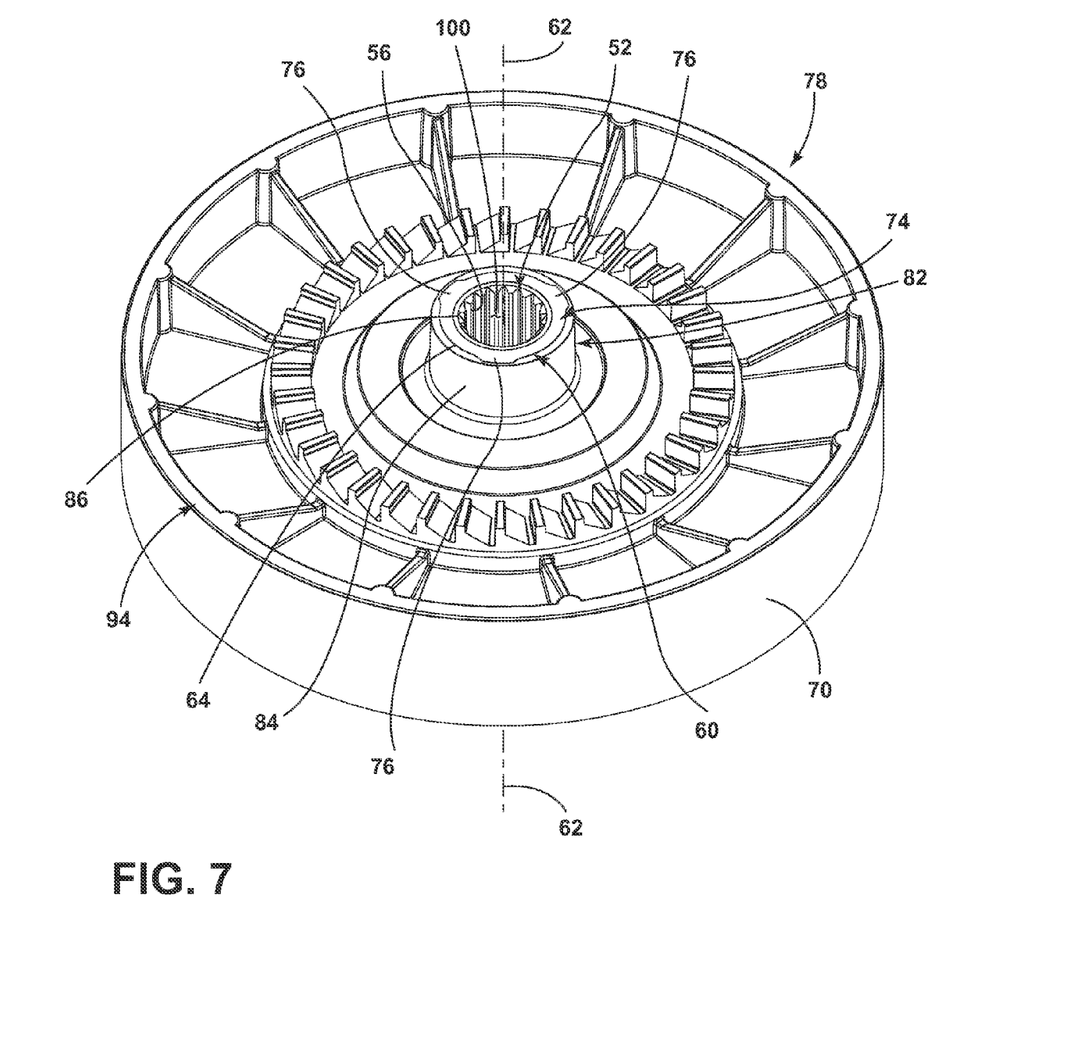
FIG. 7 is a perspective view from above of the reinforced plastic drive pulley of FIG. 6, as assembled.
Figure 8:
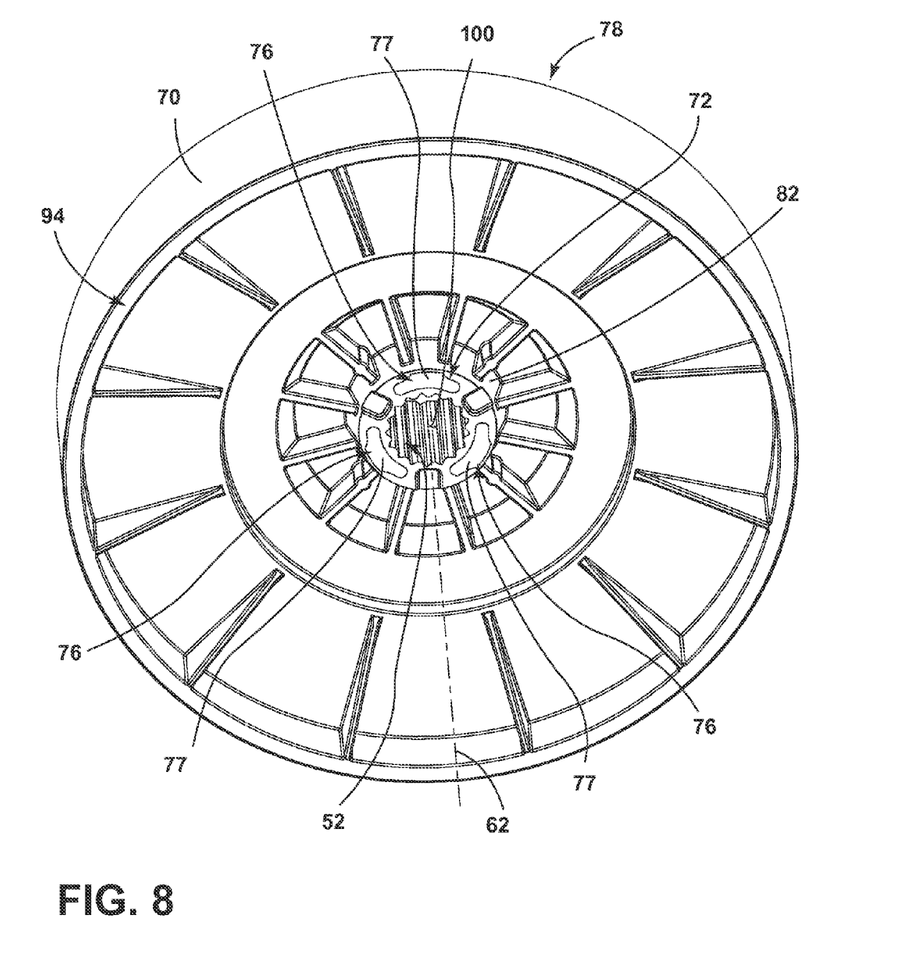
FIG. 8 is a perspective view from below of the assembled reinforced plastic drive pulley of FIG. 7.

FIG. 7 illustrates the reinforcing insert 60 and reinforced drive pulley 78 at the completion of the molding process. The insert continuous end 90 may be in co-planar disposition with the inner and outer annular walls 86, 84 to define a planar shaft end bearing surface 74. FIG. 8 illustrates the opposite side of the insert and drive pulley of FIG. 7. The insert discontinuous end 92 may be in co-planar disposition with the inner and outer annular walls 86, 84 to define a planar nut bearing surface 72.

Referring again to FIG. 5, in assembling the drive pulley 78 to the clothes mover shaft 30, the clothes mover shaft 30 may be inserted through the shaft through opening 100 so that the shaft splined section 48 may engage the hub splined section 52, with the shaft threaded section 46 extending beyond the nut bearing surface 72. This may bring the shaft bearing surface 80 against the shaft shoulder surface 58.

The nut 71 may then be threaded onto the shaft threaded section 46 to bring the nut annular flange 96 against the nut bearing surface 72. As the nut 71 is tightened against the nut bearing surface 72, the resulting axial compressive force may be transferred from the nut annular flange 96 to the nut bearing surface 72 to be carried by the finger surfaces 77. At the same time, the axial compressive force acting on the insert continuous end 90 may be transferred to the shaft end bearing surface 74. Continued tightening of the nut 71 on the shaft threaded section 46 may transfer the axial compressive force carried by both the plastic and metal portions of the central hub 82 through the nut annular flange 96 to the metal portion alone, while the plastic portion may carry a share of the compressive load that may increase to a nominal limit as the plastic deforms in response to the increasing axial compressive force.

The reinforced drive pulley 78 may enable a more durable coupling of the drive pulley 78 to the clothes mover shaft 30. The reinforcing insert 60 may carry essentially the entire axial compressive force imposed by tightening of the nut 71, enabling a connection that may be resistant to loosening. The use of powder metal may also simplify manufacture of the reinforcing insert 60 relative to mold cast or machined reinforcing inserts.

The reinforcing insert 60 has been illustrated having an exemplary configuration, i.e. a closed collar 64 transitioning to three circumferential evenly-spaced fingers 76 separated by three radial gaps 68. However, other configurations of the reinforcing insert are within the scope of the claimed invention. For example, the reinforcing insert may be a tubular or hollow cylindrical member having a continuous constant-height circumferential wall, unbroken by radial gaps. With such an insert, the circumferential wall may be radially penetrated with openings to enable plastic to flow through and around the circumferential wall, thereby "locking" the reinforcing insert 60 into the central hub 82.

Other modifications may be evident to a person having an ordinary level of skill in the relevant art. For example, the bosses 66 may be eliminated from the reinforcing insert 60. As well, other protruding elements may be utilized for the same general purposes as the bosses 66, such as to facilitate placement and manipulation of the reinforcing insert 60, control fabrication of the reinforcing insert, or facilitate anchoring of the reinforcing insert to the plastic.

Moreover, while the invention has been described in the context of a vertical axis clothes washing machine, the coupling of a metal axle with a cooperatively rotating plastic element incorporating a powder metal insert may be employed in other assemblies, such as horizontal axis washing machines, dishwashers, dryers, fans, CD recorders/players, DVD recorders/players, handheld electric power tools, e.g. drills, mixers, saws, vacuum cleaners, and the like.

While the invention has been specifically described in connection with certain specific embodiments thereof, it is to be understood that this is by way of illustration and not of limitation, and the scope of the appended claims should be construed as broadly as the prior art will permit.

What is claimed is:

1. A pulley comprising:
   a plastic body having:
      a central hub defining a through opening;
      plastic teeth extending from the central hub into the through opening;
      a shaft end bearing surface defined radially outward from the through opening; and
      a nut bearing surface defined radially outward from the through opening; and
      a metal insert located within the central hub and having:
         a collar circumscribing the through opening; and
         at least two legs extending from the collar and into the central hub; and
   wherein a first portion of the metal insert is substantially planar with the shaft end bearing surface and a second portion of the metal insert is substantially planar with the nut bearing surface and wherein the metal insert is in communication with the shaft end bearing surface and the nut bearing surface to carry axial load applied to the pulley when the pulley is assembled to a shaft with a nut; and
   wherein the plastic teeth are configured to carry rotational load applied to the pulley when the pulley is assembled to the shaft with the nut and the pulley is rotated around the shaft.

2. The pulley of claim 1 wherein at least a portion of at least one leg defines a portion of the nut bearing surface and at least a portion of the collar defines a portion of the shaft end bearing surface.

3. The pulley of claim 1 wherein at least one leg of the metal insert further transitions radially outwardly to a raised boss substantially parallel with the longitudinal axis of the metal insert.

4. The pulley of claim 1 wherein at least a portion of the collar defines a portion of the shaft end bearing surface.

5. The pulley of claim 1 wherein there are at least three legs extending from the collar and into the hub.

6. The pulley of claim 5 wherein the at least three legs are radially spaced about the collar.

7. The pulley of claim 6 wherein the collar further comprises radial projections.

8. The pulley of claim 7 wherein the metal insert is molded within the hub.

9. The pulley of claim 8 wherein the metal insert is powder metal.

10. The pulley of claim 1 wherein at least a portion of at least one leg defines a portion of the nut bearing surface.

11. A laundry treating appliance comprising:
   a basket at least partially defining a laundry treating chamber;
   a rotatable clothes mover located in the laundry treating chamber;
   a drive shaft operably coupled to the clothes mover and having a first spline coupling with a plurality of teeth; and
   a drive pulley comprising a plastic body having a central hub defining a through opening, a shaft end bearing surface, and a nut bearing surface, with a second spline coupling with a plurality of plastic teeth extending from the central hub into the through opening, and a metal insert located within the central hub and having a first axial end collar having a continuous end circumscribing the through opening and a second axial end, opposed from the first axial end, and having a discontinuous end having at least two legs extending from the collar and into the central hub wherein a first portion of the metal insert is substantially planar with the shaft end bearing surface and a second portion of the metal insert is substantially planar with the nut bearing surface to carry axial load applied to the pulley when the pulley is assembled to the drive shaft;
   wherein the teeth of the first spline coupling mesh with the teeth of the second spline coupling to couple the drive shaft to the drive pulley and to carry rotational load applied to the pulley when the pulley is assembled to the drive shaft.

12. The laundry treating appliance of claim 11 wherein at least a portion of at least one leg defines a portion of the nut bearing surface and at least a portion of the collar defines a portion of the shaft end bearing surface.

13. The laundry treating appliance of claim 11 wherein at least one leg of the metal insert further transitions radially outwardly to a raised boss substantially parallel with the longitudinal axis of the metal insert.

14. The laundry treating appliance of claim 11 wherein at least a portion of the collar defines a portion of the shaft end bearing surface.

15. The laundry treating appliance of claim 11 wherein there are at least three legs extending from the collar and into the hub.

16. The laundry treating appliance of claim 15 wherein the at least three legs are radially spaced about the collar.

17. The laundry treating appliance of claim 16 wherein the collar further comprises radial projections.

18. The laundry treating appliance of claim 17 wherein the metal insert is molded within the hub.

19. A pulley comprising:
   a plastic body having:
      a central hub defining a through opening;
      plastic teeth extending from the central hub into the through opening;
      a first planar surface defined radially outward from through opening configured to axially abut a shaft end and defining a first portion of a shaft end bearing surface; and
      a second planar surface defined radially outward from the through opening configured to axially abut a nut end and defining a first portion of a nut bearing surface; and
      a metal insert located within the central hub and having:
         a collar circumscribing the through opening and defining a second portion of the shaft end bearing surface; and at least two legs extending from the collar and into the central hub and defining a second portion of the nut bearing surface; and wherein the metal insert is configured to carry axial load applied the shaft end bearing surface and the nut bearing surface when the pulley is assembled to a shaft with a nut; and wherein the plastic teeth are configured to carry rotational load applied to the pulley when the pulley is assembled to the shaft with nut and the pulley is rotated around the shaft.

\* \* \* \* \*